US007519905B2

(12) United States Patent
Kougiouris et al.

(10) Patent No.: US 7,519,905 B2
(45) Date of Patent: Apr. 14, 2009

(54) AUTOMATIC FORMATTING AND VALIDATING OF TEXT FOR A MARKUP LANGUAGE GRAPHICAL USER INTERFACE

(75) Inventors: Panagiotis Kougiouris, San Jose, CA (US); Chip Bering, San Jose, CA (US); Rajesh Tiwari, Sunnyvale, CA (US)

(73) Assignee: WebMD Corp., New York, NY (US)

( * ) Notice: Subject to any disclaimer, the term of this patent is extended or adjusted under 35 U.S.C. 154(b) by 269 days.

(21) Appl. No.: 10/649,198

(22) Filed: Aug. 27, 2003

(65) Prior Publication Data

US 2004/0039993 A1 Feb. 26, 2004

Related U.S. Application Data

(63) Continuation of application No. 09/441,188, filed on Nov. 15, 1999, now abandoned.

(60) Provisional application No. 60/158,938, filed on Oct. 12, 1999, provisional application No. 60/165,093, filed on Nov. 12, 1999.

(51) Int. Cl.
*G06F 17/00* (2006.01)
*G09G 5/02* (2006.01)

(52) U.S. Cl. .................. 715/237; 715/234; 715/256; 345/594; 345/661

(58) Field of Classification Search .................. 715/513, 715/526, 531, 700, 760, 861, 200, 226, 231, 715/234, 237, 255, 256, 273, 710, 749, 762, 715/763, 967; 709/203; 345/594, 661
See application file for complete search history.

(56) References Cited

U.S. PATENT DOCUMENTS 4,315,309 A 2/1982 Coli ......................... 705/3

(Continued)

FOREIGN PATENT DOCUMENTS

EP 0816991 A1 * 7/1998

OTHER PUBLICATIONS

Microsoft Corporation, "Microsoft Component Services: Server Operation System A Technology Overview", last updated Aug. 15, 1998, found at www.microsoft.com/com/wpaper/compsvcs.asp, pp. 1-8.*

(Continued)

*Primary Examiner*—Doug Hutton
*Assistant Examiner*—Maikhanh Nguyen
(74) *Attorney, Agent, or Firm*—Wilmer Cutler Pickering Hale & Dorr LLP

(57) ABSTRACT

A system and method for automatically performing validation and/or formatting procedures for a graphical user interface (GUI) described in a markup language file. The GUI markup language description may comprise descriptions of various types of GUI elements for which text is to be validated/formatted, such as form fields, tables, hypertext links, etc. The markup language file may include various custom markup language attributes in order to automatically validate/format text for a GUI element. Validation/formatting procedures for GUI elements may thus be based on custom markup language attributes and are managed by a manager that is automatically instantiated when the application parses the markup language file. This manager interfaces to receive programmatic events that trigger various types of formatting/validating operations to be performed on the GUI elements.

18 Claims, 11 Drawing Sheets

U.S. PATENT DOCUMENTS

| | | | |
|---|---|---|---|
| 4,812,994 A | 3/1989 | Taylor et al. | 705/410 |
| 4,858,121 A | 8/1989 | Barber et al. | 705/2 |
| 4,868,376 A | 9/1989 | Lessin et al. | 235/492 |
| 4,882,474 A | 11/1989 | Anderl et al. | 235/380 |
| 4,916,611 A | 4/1990 | Doyle, Jr. et al. | 705/2 |
| 4,949,251 A | 8/1990 | Griffen et al. | 714/20 |
| 4,960,982 A | 10/1990 | Takahira | 235/382 |
| 4,984,272 A | 1/1991 | McIlroy et al. | 713/202 |
| 5,150,409 A | 9/1992 | Elsner | 713/177 |
| 5,241,671 A | 8/1993 | Reed et al. | 707/104.1 |
| 5,251,152 A | 10/1993 | Notess | 709/224 |
| 5,301,105 A | 4/1994 | Cummings, Jr. | 705/2 |
| 5,301,246 A | 4/1994 | Archibald et al. | 379/142.06 |
| 5,325,294 A | 6/1994 | Keene | 705/3 |
| 5,327,341 A | 7/1994 | Whalen et al. | 705/3 |
| 5,430,875 A | 7/1995 | Ma | 719/318 |
| 5,465,082 A | 11/1995 | Chaco | 340/825.49 |
| 5,491,800 A | 2/1996 | Goldsmith et al. | 709/221 |
| 5,550,971 A | 8/1996 | Brunner et al. | 395/161 |
| 5,559,885 A | 9/1996 | Drexler et al. | 235/380 |
| 5,559,888 A | 9/1996 | Jain et al. | 380/25 |
| 5,560,008 A | 9/1996 | Johnson et al. | 713/201 |
| 5,572,422 A | 11/1996 | Nematbakhsh et al. | 705/3 |
| 5,588,148 A | 12/1996 | Landis et al. | 707/1 |
| 5,629,981 A | 5/1997 | Nerlikar | 713/168 |
| 5,664,109 A | 9/1997 | Johnson et al. | 705/2 |
| 5,664,207 A | 9/1997 | Crumpler et al. | 715/505 |
| 5,736,984 A * | 4/1998 | Jellinek et al. | 715/710 |
| 5,772,585 A | 6/1998 | Lavin et al. | 600/300 |
| 5,790,785 A | 8/1998 | Klug et al. | 713/202 |
| 5,793,952 A * | 8/1998 | Limsico | 726/18 |
| 5,809,476 A | 9/1998 | Ryan | 705/2 |
| 5,815,665 A | 9/1998 | Teper et al. | 709/229 |
| 5,827,180 A | 10/1998 | Goodman | 600/300 |
| 5,832,488 A | 11/1998 | Eberhardt | 707/10 |
| 5,841,970 A | 11/1998 | Tabuki | 713/201 |
| 5,845,255 A | 12/1998 | Mayaud | 705/3 |
| 5,848,397 A | 12/1998 | Marsh et al. | 705/14 |
| 5,857,190 A | 1/1999 | Brown | 707/10 |
| 5,862,327 A | 1/1999 | Kwang et al. | 709/203 |
| 5,867,821 A | 2/1999 | Ballantyne et al. | 705/2 |
| 5,903,889 A | 5/1999 | De la Huerga et al. | 707/3 |
| 5,905,884 A | 5/1999 | Williams | 709/227 |
| 5,915,240 A | 6/1999 | Karpf | 705/2 |
| 5,953,704 A | 9/1999 | McIlroy et al. | 705/2 |
| 5,960,403 A | 9/1999 | Brown | 705/2 |
| 5,966,715 A | 10/1999 | Sweeney et al. | 707/203 |
| 5,967,789 A | 10/1999 | Segel et al. | 434/236 |
| 5,974,412 A | 10/1999 | Hazlehurst et al. | 707/3 |
| 5,978,842 A | 11/1999 | Noble et al. | 709/218 |
| 6,006,269 A | 12/1999 | Phaal | 709/227 |
| 6,018,619 A | 1/2000 | Allard et al. | 709/224 |
| 6,031,818 A | 2/2000 | Lo et al. | 370/216 |
| 6,070,160 A | 5/2000 | Geary | 707/4 |
| 6,073,106 A | 6/2000 | Rosen et al. | 705/3 |
| 6,073,163 A * | 6/2000 | Clark et al. | 709/203 |
| 6,092,196 A | 7/2000 | Reiche | 713/200 |
| 6,108,673 A * | 8/2000 | Brandt et al. | 715/236 |
| 6,112,183 A | 8/2000 | Swanson et al. | 705/2 |
| 6,115,040 A * | 9/2000 | Bladow et al. | 715/741 |
| 6,141,759 A | 10/2000 | Braddy | 713/201 |
| 6,167,523 A | 12/2000 | Strong | 713/201 |
| 6,178,416 B1 | 1/2001 | Thompson et al. | 707/3 |
| 6,189,036 B1 | 2/2001 | Kao | 709/229 |
| 6,253,228 B1 | 6/2001 | Ferris et al. | 709/203 |
| 6,263,330 B1 | 7/2001 | Bessette | 707/4 |
| 6,292,796 B1 | 9/2001 | Drucker et al. | 707/4 |
| 6,334,778 B1 | 1/2002 | Brown | 273/429 |
| 6,347,374 B1 | 2/2002 | Drake et al. | 713/200 |
| 6,362,836 B1 * | 3/2002 | Shaw et al. | 715/744 |
| 6,385,611 B1 | 5/2002 | Cardona | 707/6 |
| 6,401,072 B1 | 6/2002 | Haudenschild et al. | 705/3 |
| 6,449,598 B1 | 9/2002 | Green et al. | 705/2 |
| 6,490,620 B1 * | 12/2002 | Ditmer et al. | 709/224 |
| 6,535,883 B1 * | 3/2003 | Lee et al. | 707/100 |
| 6,654,932 B1 * | 11/2003 | Bahrs et al. | 715/507 |
| 6,782,508 B1 * | 8/2004 | Bahrs et al. | 715/526 |
| 6,826,696 B1 | 11/2004 | Chawla et al. | 713/201 |
| 6,874,025 B2 * | 3/2005 | Hoogenboom et al. | 709/225 |
| 6,880,126 B1 * | 4/2005 | Bahrs et al. | 715/526 |
| 6,901,554 B1 * | 5/2005 | Bahrs et al. | 715/526 |
| 6,915,271 B1 * | 7/2005 | Meyer et al. | 705/14 |
| 7,013,284 B2 * | 3/2006 | Guyan et al. | 705/9 |
| 7,100,195 B1 * | 8/2006 | Underwood | 726/2 |
| 7,181,686 B1 * | 2/2007 | Bahrs | 715/210 |
| 2003/0154172 A1 * | 8/2003 | Guyan et al. | 705/80 |

OTHER PUBLICATIONS

P. Henderson et al., "System Design Validation Using Formal Models", IEEE International Workshop on Jun. 16-18, 1999, pp. 1-5.*
Yip et al., "Conformance Validation of Graphical User Interface," IEEE, Mar. 1991, pp. 733-739.*
*Document Object Model (DOM) Level 1 Specification*, Version .0, World Wide Web Consortium, Oct. 1998, pp. 1-94.
"DHTML Event Model Support for Data Binding," © 2000 Microsoft Corporation, pp. 1-6.
"DHTML Object Model Support for Data Binding," © 2000 Microsoft Corporation, pp. 1-5.
"Binding HTML Elements to Date," © 2000 Microsoft Corporation, pp. 1-8.
"Adding a Data Source Object to a Page," © 2000 Microsoft Corporation, pp. 1-5.
"Data Binding," © 2000 Microsoft Corporation, pp. 1-2.
"Data Binding Architecture," © 2000 Microsoft Corporation, pp. 1-4.
"Dynamic HTML: The next Generation of User-Interface Design," Feb. 1997, Microsoft Corporation, pp. 1-7.
"Dynamic HTML Overview," Sep. 1997, Microsoft Corporation, pp. 1-3.
Cluts, "The Dynamic HTML Object Model," Oct. 1997, Microsoft Corporation, pp. 1-4.
*Objects, Images, and Applets in HTML Documents*, 1998, pp. 1-20.
Gokey, "Validating all sorts of forms data using JavaScript," Jun. 2000, pp. 1-11.
Kyrnin, "Form Validation," © About.com, Inc., pp. 1-6, 2000.
"JavaScript: Strings and Numbers," printed Aug. 2000 from http://starbase.cs.trincoll.edu website, pp. 1-6.
"Validating form input with JavaScript," Jul. 1997, Element K Content, LLC, pp. 1-20.

* cited by examiner

Exemplary Validation/Formatting Object Implementations

IDC Code Formatter
CPT4 Code Formatter
HCPCS Code Formatter
COB Code Formatter
US SSN Formatter
US Currency Formatter
US State Formatter
Name Formatter
US Street Formatter
Time Formatter
Date Formatter
US Phone Formatter
EIN Formatter
DateTime Formatter
YesNo Formatter
Boolean Formatter

Admission

Admission Date
Length of Stay
Admission Type

Clinical Information and other comments

N w Claim

Message ▮ ▮ Unsubmitted

| Medicare | Medicaid | CHAMPUS | CHAMPVA | Group Health Plan | FECA Black Lung | Other | 1a. Insured's ID Number |
| □ | □ | □ | □ | □ | □ | □ | |

2. Patient's Name
[ ] 🔍 Find...

3. Patient's Birth Date
○ M ○ F

4. Insured's Name

5. Patient's Address

6. Patient's Relationship To Insured
○ Self ○ Spouse ○ Child ○ Other

7. Insured's Address

City, State [AL ▯]   City, State [AL ▯]

8. Patient's Status
□ Single □ Married □ Other
□ Employed □ Full-time Student □ Part-time Student

Zip Code [ ]  Telephone [ ]    Zip Code [ ]  Telephone [ ]

Fig 5A

| 9. Other Insured's Name | 10. Patient's Condition Related To<br>☐ Employment? (Current or Previous) | 11. Insured's Policy Group or FECA Number |
|---|---|---|
| 9a. Tester lcd code | ☐ Auto-accident? State: [CA ▮]<br>☐ Other accident? | 11a. Boolean Tester<br>○ M ○ F |
| 9b. Yes No Tester<br>○ M ○ F | | 11b. COB Code Tester |
| 9c. HCPCS Code Tester | | 11c. Insurance Plan or Program Name |
| 9d. Insurance Plan or Program Name | 10d. Time Tester | 11d. Is there another health benefit plan?<br>○ Yes ○ No |
| 14. Date time tester | 15. If patient has had same or similar illness, first date | 16. Dates patient unable to work in current occupation<br>From: [ ] To: [ ] |
| 17. Name of Referring Physician or other source<br>[ 🔍 Find... ] | 17a. ID Number of Referring Physician | 18. Hospitalization dates related to current services<br>From: [ ] To: [ ] |
| 19. Reserved for local use | | 20. Outside Lab?<br>○ Yes ○ No  $[ ] |
| | | 22. Medicaid Resubmission<br>Code   Orig. Ref No<br>[ ]   [ ] |
| 21. Diagnosis or nature of Illness or Injury | | 23. Prior Authorization Number<br>[ ] |

Fig 5E

| 24 | A | B | C | D | | E | F | G | K |
|---|---|---|---|---|---|---|---|---|---|
| | Date of Service (From/To) | Place | Type | Procedure Code (CPT/HCPCS) | Modifier Codes | Diagnosis Code | Charges ($) | Days/Units | Reserved For Local Use |
| 1 | 12/12/1998 12/12/1998 | sdf | | | sdf | | | | |

Total Charge: $100.00
Total Amount Paid: $0.00

Balance Due: $100.00

25. Federal Tax ID Number
○ SSN ○ EIN

26. Patient's Account Number

27. Accept Assignment?
○ Yes ○ No ○ Both

32. Name and Address of facility where services were rendered

33. Physician's/Supplier's Billing Name, Address, ZIP Code and Phone

Fig 5C

AUTOMATIC FORMATTING AND VALIDATING OF TEXT FOR A MARKUP LANGUAGE GRAPHICAL USER INTERFACE

PRIORITY CLAIM

This application is a continuation of U.S. patent application Ser. No. 09/441,188, filed Nov. 15, 1999, entitled AUTOMATIC FORMATTING AND VALIDATING OF TEXT FOR A MARKUP LANGUAGE GRAPHICAL USER INTERFACE, which is hereby incorporated by reference in its entirety for each of its teachings and embodiments.

This application claims benefit of priority of U.S. provisional application Ser. No. 60/158,938 titled "Text Formatting and Validating Components for Healthcare-Related Graphical User Interfaces" filed Oct. 12, 1999, whose inventors were Chip Bering and Panagiotis Kougiouris.

This application claims priority of U.S. provisional application Ser. No. 60/165,093 titled "Automatic Formatting and Validating of Text for a Markup Language Graphical User Interface" filed Nov. 12, 1999.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to the field of graphical user interfaces (GUIs), and more particularly, to a system and method for data formatting and validation of graphical user interface text fields.

DESCRIPTION OF THE RELATED ART

Graphical user interfaces (GUIs) often include text fields for accepting text input or displaying text output. For example, graphical user interfaces may comprise a "form", that is a series of text fields with a look and feel similar to a paper-based form. Many text fields are designed to accept text input or display text output that is often formatted or demarcated in a particular way. For example, a social security number text field may be formatted according to the pattern "###-##-####", where each '#' placeholder represents a digit.

User interfaces often enable users to enter text in free form and have the text be automatically validated or formatted according to the appropriate pattern. For example, a user may be able to type the text "555555555" in a social security number field and the text may automatically appear in the field as "555-55-5555". On the other hand, if the user enters invalid text, e.g. "55y555555", in the field, then the application may indicate that the text is invalid, e.g., by displaying the text in red.

One problem involved with enabling this type of automatic text validation/formatting is that the algorithms can be tedious and time-consuming to implement. Also, the algorithm implementations are prone to errors. It may be relatively easy to design a validation/formatting algorithm for the social security pattern example above, but other types of text patterns or codes may be significantly more complicated, and it can be time-consuming and difficult to verify that the algorithms work correctly for all cases. Rather than expending the effort to implement robust text validation/formatting code, software developers often opt to forgo the validation/formatting procedures altogether. Thus, it may be desirable to provide an implementation of correct code for performing validation/formatting procedures, and to enable the code to be reused.

Graphical user interfaces based on markup language descriptions are becoming increasingly important and common in applications. This is in part due to the popularity and importance of the World Wide Web and web applications, many of which utilize graphical user interfaces created from markup language descriptions, such as HTML or XML-derived markup language descriptions. GUIs created from markup languages may enable users to interact with an application using a familiar type of user interface and may enable software developers to develop user interfaces that are largely separated from application logic.

However, existing methods for performing text formatting and validating procedures for markup language user interface text fields often mix application logic with user interface code. For example, many HTML pages include validation/formatting logic in the HTML page itself, e.g., as JavaScript event handlers that are called in response to certain user interface events. Thus, validation/formatting code may need to be included in each page needing validation/formatting procedures to be performed, which may make the application difficult to maintain, may expose portions of application logic to users, etc., in addition to the drawbacks described above.

SUMMARY OF THE INVENTION

The problems outlined above may in large part be solved by providing a system and method for automatically performing validation and/or formatting procedures for a graphical user interface (GUI) described in a markup language file. The markup language may be any of various markup languages, including HTML and XML-derived markup languages. The graphical user interface markup language description may comprise descriptions of various types of graphical user interface elements for which text is to be validated/formatted, such as form fields, tables, hypertext links, etc.

An author of a markup language file may include various custom markup language attributes in order to automatically validate/format text for a GUI element. For example, an HTML file may include the following GUI element description:

<INPUT NAME="SSN:" HSFORMAT="usssn"> which includes a custom HSFORMAT="usssn" attribute, indicating that the element should be validated/formatted according to a U.S. social security number pattern. Any of various codes or patterns may be supported in a particular embodiment, and an extensible framework enabling support for new types of codes or patterns to be easily "plugged in" may be utilized, as described below.

The validation/formatting procedures may be managed by an executable component referred to as a "validation/formatting manager component". The markup language file may include a tag for instantiating the validation/formatting manager component, as appropriate to a particular markup language. For example, an HTML file may include an <object> or <applet> tag for instantiating the manager component. The tag for instantiating the validation/formatting manager component may include attributes or sub-tags for specifying the default behavior of the validation/formatting manager component.

The validation/formatting manager component is operable to perform validation/formatting for GUI elements, based on the custom markup language attributes. The manager component may obtain a reference to a document object describing the markup language file and its various elements, or may be passed a reference to such a document object when the component is instantiated. For example, for an HTML file, this document object may be constructed based on the standard HTML Document Object Model (DOM) or a variant of the DOM, such as Microsoft's Dynamic HTML Object Model. The validation/formatting manager component may traverse the document object in order to determine information regarding the custom validating/formatting attributes associated with each GUI element.

The validation/formatting manager component may interface with the application displaying the markup language GUI in order to receive dynamic programmatic events from the application. For example, as a user presses keys to type text into a social security number field, the application may generate a "KeyUp" event as each key is released. In response to receiving the "KeyUp" event associated with the social security number field, the validation/formatting manager component may be operable to retrieve the text from the field, e.g., via the document object, and then perform a validation/formatting procedure on the text.

In one embodiment, custom attributes specifying how the validation/formatting manager component should respond to events associated with a GUI element may be added to a GUI element description in the markup language file. For example, the input form field HTML element description shown above may be modified with a custom attribute, such as:

<INPUT NAME="SSN:" HSFORMAT="usssn"
        HSVALKEYUP="1"> where the HSVALKEYUP="1" attribute specifies that the validation/formatting manager component should validate the text associated with the input form field in response to receiving "KeyUp" events associated with the form field. As described below, any of various other custom attributes specifying validation/formatting information may be supported.

In one embodiment, the validation/formatting manager component is operable to perform the various validating/formatting procedures itself. However, in the preferred embodiment, the validation/formatting manager component interfaces with various validation/formatting components, where each validation/formatting component may correspond to a particular text pattern or code. As described below, the manager component may use an attribute describing the pattern or code associated with a GUI element, e.g., the HSFORMAT="usssn" example attribute shown above, in order to determine the appropriate validation/formatting component.

Each validation/formatting component preferably provides methods according to a standard validation/formatting interface, so that the manager component may call each validation/formatting component independently of the particular text pattern or code associated with the component. Thus, validation/formatting components may be added to the framework as desired.

After calling the appropriate method of the validation/formatting component and receiving the results, the validation/formatting manager component may take any of various actions, as appropriate. For example, in response to determining that the text for a GUI element is invalid, the manager component may cause the GUI element text to turn red, e.g., by setting a property in the document object controlling the GUI element text color. As another example, in response to receiving a properly formatted text buffer in accordance with a particular text pattern or code, the manager component may re-set the GUI element text value to use the formatted text. As described below, various aspects of the behavior of the manager component, such as when to call validation/formatter methods, what to do in response to receiving the method results, etc., may be specified by validation/formatting information in the markup language file.

BRIEF DESCRIPTION OF THE DRAWINGS

A better understanding of the present invention can be obtained when the following detailed description of the preferred embodiment is considered in conjunction with the following drawings, in which:

FIGS. 5A-5C illustrate a graphical user interface created from an HTML description;

Figure 1:
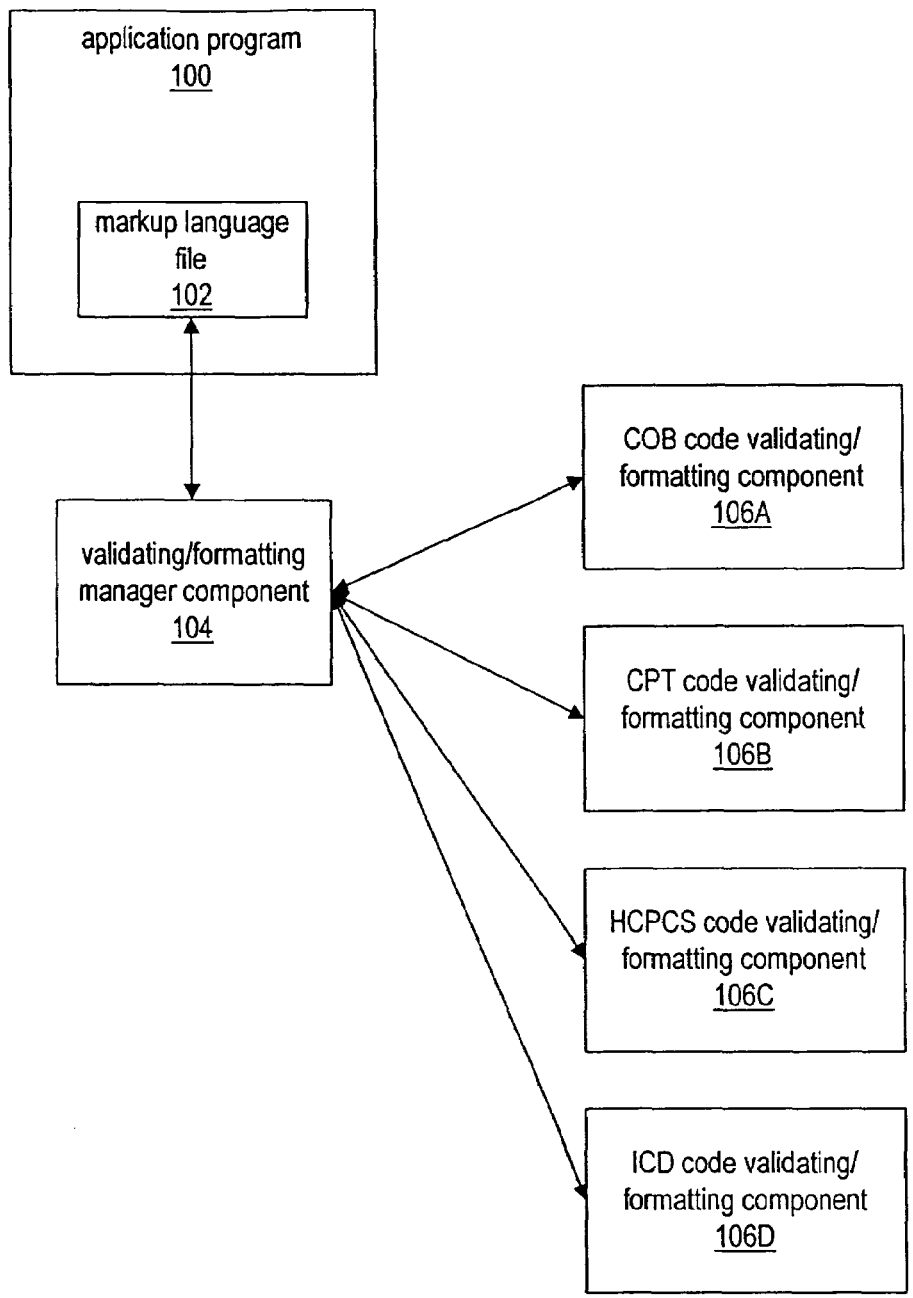
FIG. 1 illustrates one embodiment of a system enabling the automatic validating/formatting of text associated with markup language graphical user interface (GUI) elements.

While the invention is susceptible to various modifications and alternative forms specific embodiments are shown by way of example in the drawings and are herein described in detail. It should be understood however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference.

For information on the Component Object Model, please refer to:

Box, *Essential COM,* Addison-Wesley, 1998; or to

Chappell, *Understanding ActiveX and OLE,* Microsoft Press, 1996.

For information on constructing applications that utilize the Microsoft Internet Explorer code base, please refer to:

Isaacs, *Inside Dynamic HTML,* Microsoft Press, 1997; or to

Roberts, *Programming Microsoft Internet Explorer 5*, Microsoft Press, 1999.

FIG. 1—System for Automatic Validation/Formatting

FIG. 1 illustrates one embodiment of a system enabling the automatic validating/formatting of text associated with markup language graphical user interface (GUI) elements.

The embodiment of FIG. 1 illustrates an application program 100, which processes a markup language file 102. The application program 100 may be any type of application program enabled to process a markup language file. For example, the application program may be a web browser application enabled to process an HTML file or an XML-derived markup language file. The application program 100 may also be an application that is not considered to be a web browser application per se, but includes web browsing capabilities. For example, various web browser applications, such as the Microsoft Internet Explorer web browser, enable applications to interface with the web browser code base, in order to utilize its capabilities. Thus, the application program 100 may itself provide the executable code for processing the markup language file 102, or the application program 100 may interface with another application which processes the markup language file 102.

The markup language file 102 may be a file comprising any type of markup language code, such as HTML code, XML-derived markup language code, or another type of markup language code. The markup language file may include a description of a graphical user interface, i.e., various markup language descriptions of GUI elements, which the application program 100 is operable to process and display a graphical user interface corresponding to the GUI elements. The GUI description may comprise descriptions of GUI elements with which text may be associated in various ways. For example, a GUI element may comprise one or more fields for accepting text input and/or displaying text output, may comprise a text label, etc. Examples of GUI elements with which text may be associated include form fields, tables, hypertext links, etc.

As shown in FIG. 1, a validating/formatting manager component 104 interfaces with the application program 100. The validating/formatting manager component 104 may interface with the application program in any of various ways, as supported by a particular application program. For example, for a Windows-based application, the manager component may interface with the application via Component Object Model (COM) interfaces. In other embodiments, the manager component and the application may communicate using other means, such as Java interfaces, CORBA interfaces, etc.

In one embodiment, the validating/formatting manager component 104 is an executable component that is instantiated in response to the application program 100 processing the markup language file 102. The markup language file may comprise markup language code, e.g. a particular tag, causing the application program to instantiate the validating/formatting manager component. For example, an HTML markup language file may comprise an <OBJECT> or an <APPLET> tag for instantiating the manager component. The validating/formatting manager component 104 may be any of various types of executable modules or components, as supported by a particular application and environment, such as an ActiveX/COM object, a Java object, etc. As an example, in a Windows application processing an HTML file, the validation/formatting manager component may be instantiated as an ActiveX control with markup language code such as:

```
<OBJECT
    ID="hsDHTMLCt1"
    CLASSID="clsid:17F34ED5-FB59-11D1-801A-00201829472A"
    ALIGN="baseline" BORDER="0" WIDTH="0" HEIGHT="0">
</OBJECT>
```

The validating/formatting manager component 104 is enabled to receive programmatic user interface events associated with the markup language GUI from the application program 100, using appropriate means for a particular embodiment. For example, for a manager component that interfaces with an application program via COM interfaces, the manager component may receive programmatic events via a COM connection point event mechanism. In one embodiment, the application program 100 utilizes the Microsoft Internet Explorer code base to process the markup language file and display the GUI, and the manager component 104 interfaces with the Internet Explorer components in order to receive events associated with the GUI. For more information on interfacing with Internet Explorer components, please refer to the above-incorporated references.

The validating/formatting manager component 104 may receive various types of user interface events from the application program 100, depending on the particular embodiment. Each type of GUI element, e.g., table cell, hypertext link, etc., may have a particular set of associated user interface events. As examples, user interface events may correspond to the following actions performed on a GUI element:

changing the value of the GUI element
    pressing a key
    releasing a key
    causing the GUI element to gain user interface focus
    causing the GUI element to lose user interface focus
    moving a mouse pointer over the GUI element
    moving a mouse pointer away from the GUI element
    clicking on the GUI element
    double-clicking on the GUI element This list is exemplary only, and actions performed on a GUI element may cause the application program 100 to send many other types of events to the manager component 104. It is noted that, in addition to receiving user interface events that are initiated in response to a user action such as a mouse click, the manager component 104 may also receive events that are initiated in response to a programmatic action, e.g., programmatically setting the text value of an input field.

As shown in FIG. 1 and described below, the validating/formatting manager component 104 may interact with various types of validating/formatting components 106. Each validating/formatting component 106 may be operable to validate/format text according to a particular pattern or code. For example, FIG. 1 illustrates exemplary validating/formatting components 106 for Coordination of Benefits (COB) codes, Current Procedural Terminology (CPT) codes, HCFA Common Procedure Coding System (HCPCS) codes, and International Classification of Diseases (ICD) codes. The interaction of the validating/formatting manager component 104 with validating/formatting components 106 is described below.

Figure 2:
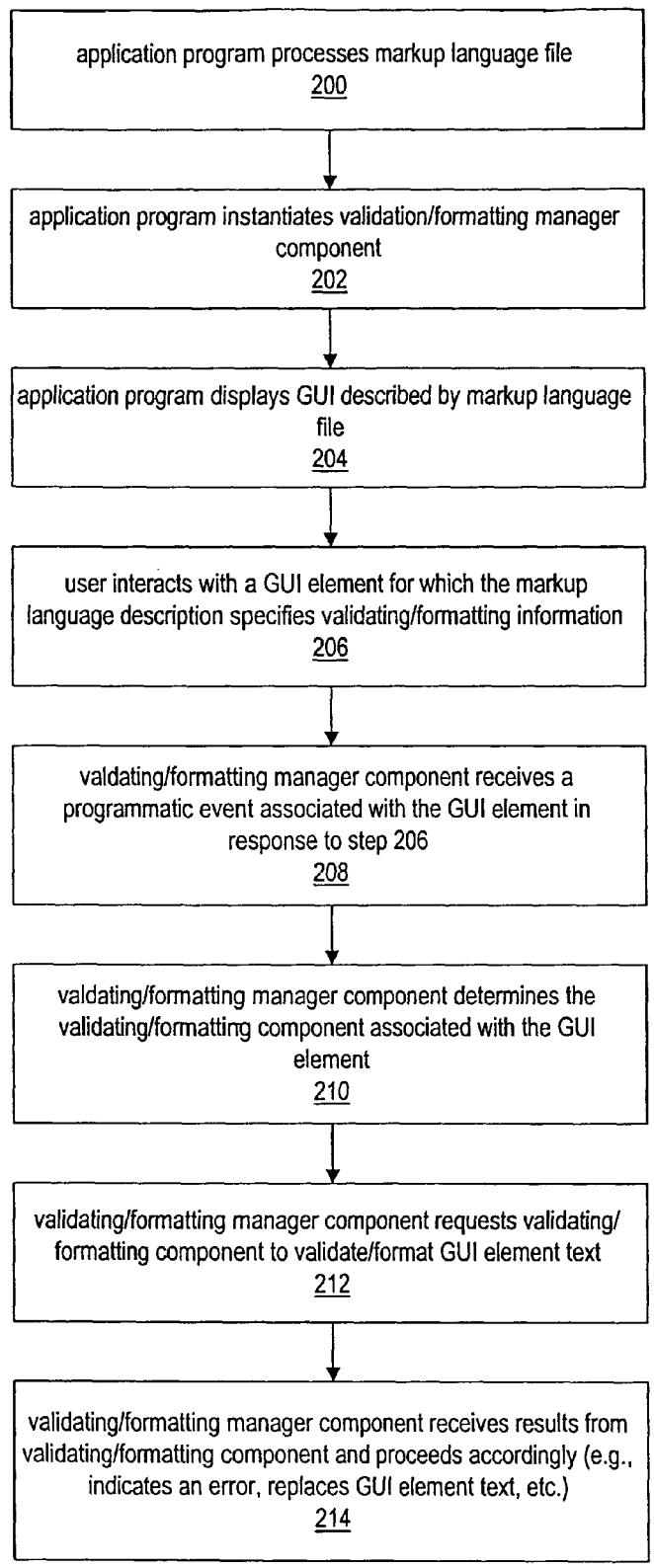
FIG. 2 is a flowchart diagram illustrating one embodiment of a process for performing validating/formatting operations for a graphical user interface created from a markup language description.

FIG. 2—Validating/Formatting Process

FIG. 2 is a flowchart diagram illustrating one embodiment of a process for performing validating/formatting operations for a graphical user interface created from a markup language description.

As shown in step 200, an application program processes a markup language file comprising a description of a graphical user interface.

In step 202, the application program instantiates a validation/formatting manager component. For example, as described above, the markup language file may comprise information, e.g., a tag, causing the application to instantiate the validation/formatting manager component.

As described above, the markup language file may comprise descriptions of various GUI elements of a graphical user interface. The GUI may comprise any of various types of user interface elements, and the application may display the GUI in any of various ways, depending on the particular markup language, the way the application is configured to process the markup language, the particular computer system the application is running on, etc. An example of an HTML markup language file and its associated GUI are discussed below.

The markup language file GUI descriptions may comprise information usable by the validation/formatting manager component to perform various types of validating/formatting operations. This information may exist as markup language tag attributes, e.g., by adding custom validation/formatting attributes to a standard markup language (or by incorporating the validation/formatting attributes into the specification of the markup language). For example, an HTML input form field element may have a description such as:

```
<INPUT NAME="COB code:"
    HSFORMAT="COBcode"
    HSVALKEYUP="1">
```

In this example, the validation/formatting manager component may be operable to use the HSFORMAT attribute to associate the input element with a particular pattern or code, i.e., a Coordination of Benefits (COB) code, and the validation/formatting manager component may be operable to use the HSVALKEYUP attribute to validate text for the input element in response to a particular user action performed on the input element, i.e., pressing and releasing a key.

The validation/formatting manager component may be operable to determine the validation/formatting information specified in the GUI descriptions in any of various ways. For example, in one embodiment, the manager component may obtain a reference to a "document object" describing the markup language file. The manager component may obtain a reference to the document object by being passed a reference to the document objet when the manager component is instantiated. The document object may encapsulate objects, e.g., object-oriented style objects, that are arranged in a hierarchy and are related to each other in such a way as to form a representation of the markup language file and its various elements.

For example, for an HTML file, the document object may be created according to the standard HTML Document Object Model (DOM) or a variant of the DOM, such as Microsoft's Dynamic HTML Object Model. In this case, the document object may encapsulate an object hierarchy comprising objects representing various HTML elements comprised in the HTML file, such as frames, images, links, etc. For more information on the DOM, please refer to the World Wide Web Consortium's DOM Specification or to the above-incorporated references. As another example, for an XML file, the document object may be created according to the XML Object Model. The document object is preferably created by the application program in step 200, as part of processing the markup language file. For example, web browser programs (or programs using web browser program components) are typically enabled to create a document object according to the HTML Document Object Model as part of processing an HTML file.

After obtaining or receiving a reference to a document object describing the markup language file, the validation/formatting manager component may traverse the document object, checking to see whether each of the various GUI element descriptions comprise validation/formatting information, e.g., stored as attributes such as described above. The manager component may store the validation/formatting information in a data structure for rapid access later.

It is noted that validation/formatting information may be listed in the markup language file so that the information applies to multiple GUI elements. For example, for an HTML table element, the <TABLE> tag itself may comprise an HSFORMAT="phone" attribute, so that a telephone number pattern is associated with all table cells by default. In this example, individual table cells may then override the default information, e.g., by including their own HSFORMAT="date" attribute in the table cell description. The validation/formatting manager component is preferably enabled to associate the appropriate formatting and validation information with each GUI element.

The markup language code for instantiating the validation/formatting manager component may also include information for specifying the default validation/formatting behavior of the manager component, e.g., as attributes or sub-tags of an instantiation tag. For example, the manager component instantiation example described with reference to FIG. 1 may have a parameter sub-tag, such as

```
<OBJECT
    ID="hsDHTMLCt1"
    CLASSID="clsid:17F34ED5-FB59-11D1-801A-00201829472A"
    ALIGN="baseline" BORDER="0" WIDTH="0" HEIGHT="0">
<PARAM NAME="validateOnKeyUp" VALUE="0">
</OBJECT>
``` where the <PARAM> sub-tag specifies that the validation/formatting manager component should not respond to "KeyUp" events for a GUI element unless the GUI element description explicitly overrides this, as shown in the above input form field element example.

In step 204, the application program displays the GUI described in the markup language file. As described above, the GUI may comprise various GUI elements for which validation/formatting information is specified in the markup language file.

In step 206, a user interacts with a GUI element for which validation/formatting information is specified in the markup language file. This user interaction may comprise any of various actions, such as changing the value of the GUI element, moving a mouse pointer over the GUI element, or other actions, such as described above with reference to FIG. 1. The user interaction of step 206 preferably causes the application program to generate a programmatic event associated with the GUI element, which the validation/formatting manager component is operable to receive in step 208. The interface between the application program and the manager component is discussed above.

As described above, the markup language file may comprise information regarding what types of validating/formatting operations the manager component should perform and what user interface events the manager component should respond to, and the manager component may be enabled to perform certain validating/formatting operations by default in response to receiving certain events. If the default configuration and/or the validation/formatting information for the GUI element do not specify that the manager component should perform a validation/formatting operation for the event received in step 208, then the manager component may ignore the event.

In step 210, the validation/formatting manager component determines the validating/formatting component associated with the GUI element for which an event was received. As described above, the manager component may determine the validation/formatting information specified for each GUI element, e.g. by traversing a document object comprising this information. The manager component may use the validation/formatting information to determine the appropriate validation/formatting component for the particular text pattern or code associated with the GUI element. In one embodiment, a general framework enabling new validation/formatting components to be easily "plugged in" may be utilized. In this embodiment, the manager component may not have knowledge of particular codes or knowledge of how to instantiate particular validation/formatting components for these codes, but may instead simply call a factory component, where the factory component is responsible for instantiating the appropriate validating/formatting component.

In one embodiment, the manager component passes the factory component the value of an attribute in the markup language file as an argument in order to identify the appropriate validation/formatting component. For example, for the above input form field description, the manager component may obtain the HSFORMAT="COBcode" attribute information from the document object and pass the value "COBcode" as an argument to the factory component, e.g. calling a "Get( )" method provided by the factory component, where this method returns a reference to an appropriate validation/formatting component instantiation.

In step 212, the validation/formatting manager component requests the validation/formatting component to perform a validation/formatting operation on the GUI element text. The manager component may obtain the GUI element text in any of various ways, e.g. by dynamically obtaining the text from the document object, by receiving the text as an argument along with the event in step 208, etc. The manager component may then request the validation/formatting component to perform the appropriate validation/formatting operation, as determined by the event received in step 208, the validation/formatting information specified in the GUI element markup language description, and the default configuration of the manager component. The manager component may perform this request by calling a method provided by the validation/formatting component, passing the GUI element text as an argument.

In one embodiment, each validation/formatting component provides methods according to a standard validation/formatting interface that the manager component has knowledge of. This interface may define methods such as IsValid( ), for determining whether the text is valid text for the particular code, GetConforming( ), to get a properly formatted version of the text, etc. One embodiment of such a validation/formatting interface is described below. Thus, the validation/formatting manager component may to simply call the appropriate method of the validation/formatting component, regardless of the particular pattern or code associated with the GUI element.

In step 214, the validation/formatting manager component receives the request results from the validation/formatting component and proceeds accordingly, depending on such factors as: the particular event received, the default behavior programmed for the manager component, the behavior specified in the validating/formatting information in the markup language file.

As one example, the manager component may be enabled to validate text for a GUI element when a user presses a key to change the GUI element text, i.e., when the manager component receives a "KeyUp" event indicating that the user pressed a key. For example, in response to receiving this event, the manager component may call an IsValid( ) method provided by the validation/formatting component for the GUI element's associated pattern or code, passing the GUI element text as an argument. For a Boolean value of "False" received from the IsValid( ) method, the manager component may be configured by default to display an informational window or dialog box to the user, informing the user of the invalid text. However, the GUI element description may include an attribute overriding this default behavior for invalid text For example, an HTML input form field description may appear as:

```
<INPUT NAME="COB code:"
HSFORMAT="COBcode"
HSVALKEYUP="1"
HSINVCLASS="INVALIDORANGE">
``` where the HSINVCLASS="INVALIDORANGE" attribute indicates that the manager component should cause the GUI element text to turn orange, instead of the default behavior of displaying a window. Advantageously, various "invalid" styles may be defined, and any appropriate style may be applied to indicate an invalid value. For example, INVALIDORANGE may be defined as

```
</STYLE>
<STYLE TYPE="text/css">
.INVALIDORANGE {
    background: #FFC800;
}
</STYLE>
``` which uses style sheet mechanisms supported by HTML to define a style. Various other invalid styles may of course be defined, as appropriate for a particular application.

It will be obvious that many various validation/formatting attributes may be supported, and that the manager component may be enabled to perform any of various actions in response to receiving the request results from the validation/formatting component, as appropriate for a particular situation. For example, the manager component may cause the visual appearance of GUI elements to be altered in various ways, the manager component may cause user actions to be ignored, e.g. a key press that would result in an invalid text value, etc. As discussed above, the manager component may interface with the application in any of various ways in order to cause these actions to occur. In one embodiment, the manager component may set properties of the document object, and the application is enabled to dynamically alter the GUI accordingly. For example, for an HTML GUI, this ability is referred to as "Dynamic HTML". For more information on dynamic HTML, please refer to the above-incorporated references.

As noted above, FIG. 2 represents an exemplary embodiment of a process for performing validating/formatting operations for a graphical user interface created from a markup language description, and various steps of FIG. 2 may, of course, be altered, omitted, combined, added, etc.

For example, although the discussion above focuses on a user interface event generated as a result of a user action, such as a key press, the validation/formatting manager component may also receive events resulting from a programmatic action. For example, programmatically setting the value of a GUI element may cause the manager component to receive a "ValueChanged" event associated with the GUI element. Thus, for example, if unformatted text is retrieved from a database and used to populate a GUI element when the GUI is initially displayed, the manager component may automatically receive a "ValueChanged" event generated as a result of populating the GUI element, may format the text appropriately, and may reset the GUI element value to use the formatted text.

As another example, FIG. 2 is described in terms of a general framework allowing any of various types of patterns or codes to be supported, in which the manager component does not utilize knowledge regarding particular patterns or codes. However, the manager component may utilize such knowledge of particular codes, if desired. Also, the particular validation/formatting components may be responsible for performing the types of actions discussed for step 214, rather than the manager component. In this way, each validation/formatting component may differ in the behavior caused by the determination of invalid text, etc.

The time at which various aspects of FIG. 2 occur may, of course, be altered or tailored to a specific embodiment, as appropriate. For example, the manager component may instantiate each of the validation/formatting components for the GUI when the GUI is first displayed, or the manager component may wait until a validation/formatting component is needed before instantiating it, etc. The manager component may traverse the document object at any of various times, as appropriate to a specific embodiment.

Figure 3:
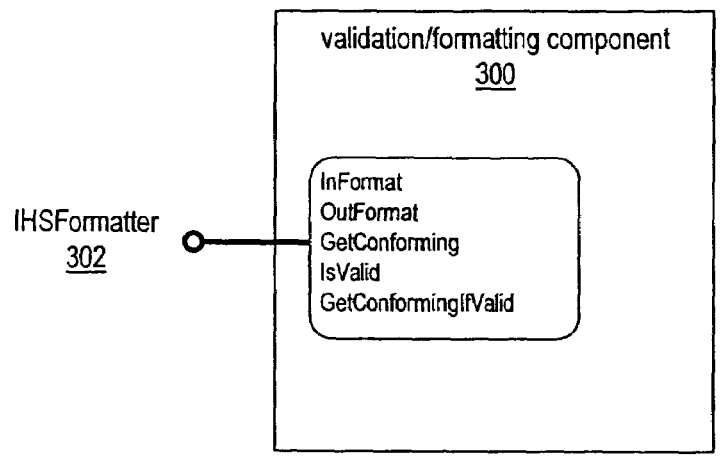
FIG. 3 illustrates one embodiment of a standard validation/formatting interface supported by validation/formatting components.

FIG. 3—Exemplary Embodiment of Validation/Formatting Interface

As discussed above, in one embodiment each validation/formatting component provides methods according to a standard validation/formatting interface, so that the manager component may call each validation/formatting component independently of the particular text pattern or code associated with the component. FIG. 3 illustrates one embodiment of such an interface.

In the FIG. 3 example, each validation/formatting component supports an "IHSFormatter" interface, where this interface includes various methods related to performing validation/formatting operations. For example, the interface includes an IsValid( ) method that returns a boolean result indicating whether or not the string passed as an input parameter is a valid string according to the pattern or code associated with the validation/formatting component. The interface also includes a GetConforming( ) method that parses an input string according to the pattern or code and returns a formatted string.

The FIG. 3 interface also illustrates InFormat( ) and OutFormat( ) methods. The InFormat( ) method accepts a format code as a parameter, to inform other component methods, such as the IsValid( ) method, of which formatting pattern or code to use in parsing strings that are passed as input parameters. The OutFormat method accepts a format code as a parameter, to inform other component methods, such as the GetConforming method, of which formatting pattern or code to use in formatting output strings. Thus, for compatible patterns/codes, text may be converted from one pattern/code to another.

FIG. 3 also illustrates several exemplary patterns or codes. Each particular validation/formatting component implementation may implement the methods of the validation/formatting interface as appropriate for one or more of these patterns or codes, or other patterns or codes not shown in FIG. 3.

It is noted that, although each pattern or code may have a unique associated validation/formatter component implementation, component implementations may also provide support for more than one pattern or code. For example, a particular validation/formatter component implementation may support both U.S. and European telephone codes. The component need only keep state information enabling it to determine which pattern or code to use at a particular time or for a particular client.

Also, although validation/formatting components are discussed in terms of a single component implementing both validation and formatting methods, the validation and formatting functionality may, of course, be separated into separate components.

Figure 4:
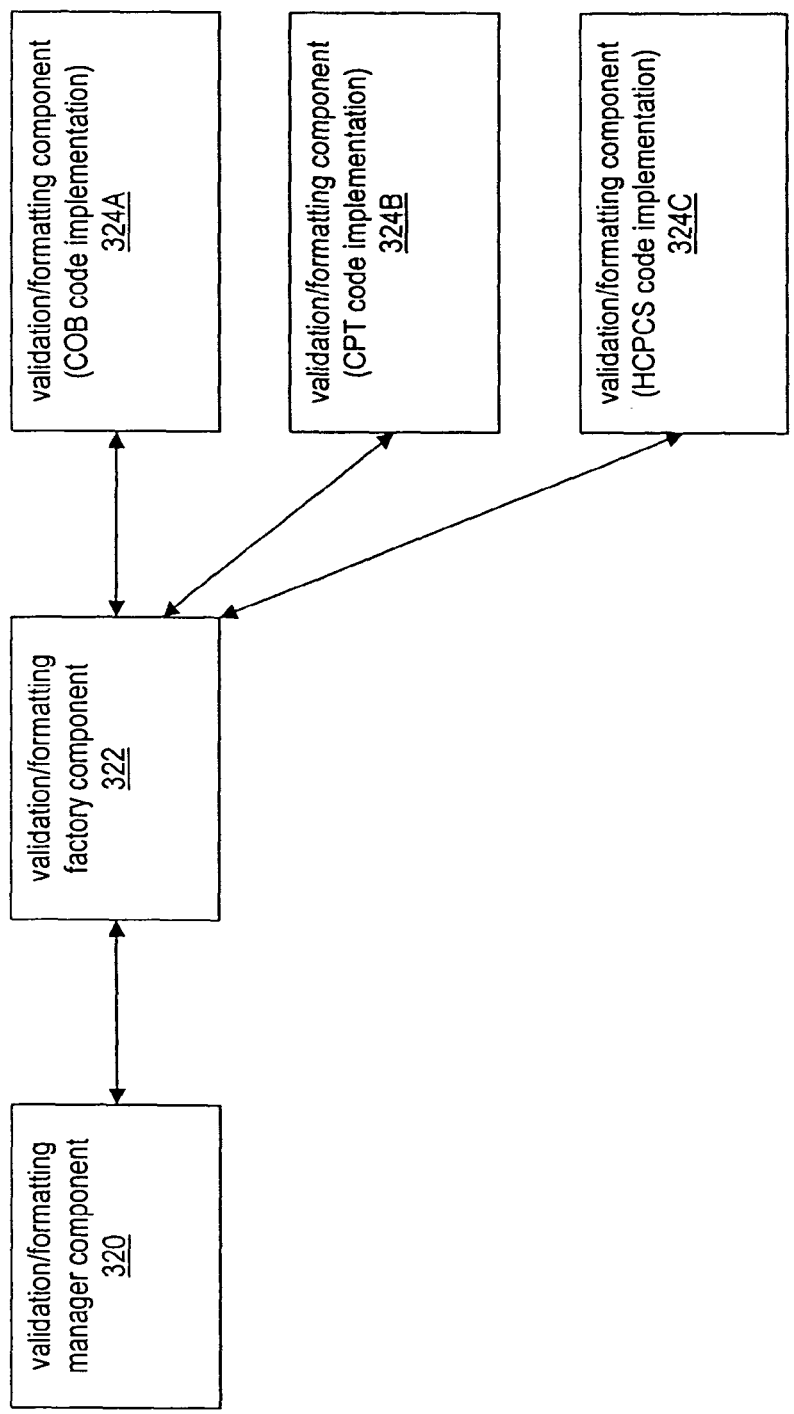
FIG. 4 illustrates an embodiment employing a factory component.

FIG. 4—Factory Component

As described above, the validation/formatting manager component may obtain a reference to a particular validation/formatting component via an intermediate factory component. FIG. 4 illustrates an embodiment employing a factory component.

As described above, the manager component may pass the factory component the value of an attribute in the markup language file as an argument in order to identify the appropriate validation/formatting component. For example, for a GUI element description comprising a HSFORMAT="COBcode" attibute, the manager component may obtain this attribute information from the document object and pass the value "COBcode" as an argument to the factory component, e.g. calling a "Get( )" method provided by the factory component, where this method returns a reference to an appropriate validation/formatting component instantiation, which in this case would be the COBcode validation/formatting component 324A.

FIG. 5—Exemplary Markup Language Graphical User Interface

As discussed above, the system and method described herein may be applied to graphical user interfaces created from various types of markup language descriptions. FIGS. 5A-5C illustrate a graphical user interface created from an HTML description. The HTML file used to create the FIG. 5 GUI is included as Appendix A. This HTML file illustrates the use of various custom formatting/validating attributes such as those shown above.

COM Embodiment

As noted above, the various components described herein, such as the manager component and the validation/formatting components, may interact with an application program in any of various ways and may be implemented using any of various component software specifications, e.g., as COM components, CORBA components, JavaBeans components, etc.

In one embodiment, the Component Object Model (COM) is used for component implementation. Appendix B is a COM IDL file for a COM embodiment of the manager component and the validating/formatting components.

As shown in the Appendix B embodiment, support may be provided for validating/formatting text according to the following codes, which include healthcare-specific codes:

International Classification of Diseases (ICD) code
    Current Procedural Terminology (CPT) code
    Coordination of Benefits (COB) code
    HCFA Common Procedure Coding System (HCPCS) code
    U.S. Employer Information Number (EIN)
    U.S. Social Security Number
    U.S. Currency
    U.S. states and territories
    U.S. telephone number system
    U.S. zipcode system
    human names
    street names
    time of day
    date
    date and time
    yes/no
    boolean value The Appendix B IDL documents the corresponding pattern for each code. The listed codes are of course exemplary, and various other embodiments may support other types of codes.

Although the text validating/formatting components are discussed above in conjunction with a validating/formatting manager component that interacts with an application processing a markup language file, the validating/formatting components may also be constructed so that the components may be used in other contexts.

For example, the COM specification is supported by several development environments, such as Microsoft's Visual Studio suite, Borland's Delphi, etc. Thus, in one embodiment the text validating/formatting component may be used from any application developed using a development environment that supports the COM component specification. When the application needs to format or validate text, the application may call methods through a COM interface.

For example, although user interfaces are discussed above with reference to markup language GUI descriptions, user interfaces may also be created in other ways, e.g., by a Visual Basic program. When a user enters text into a user interface text field created from a Visual Basic program and then tabs away from the control, the program may intercept an event indicating that the user tabbed away from the control, similarly to the description above. The program may then call a component method to verify that the text entered by the user is valid text, e.g. by verifying that the text is of a specific length or matches a particular pattern of characters. The application may then take appropriate action, e.g. by highlighting the user interface control to indicate that the text is invalid, or by calling another component method to format the valid text by inserting parentheses, dashes, etc. and then redisplaying the text in the user interface, etc.

Figure 6:
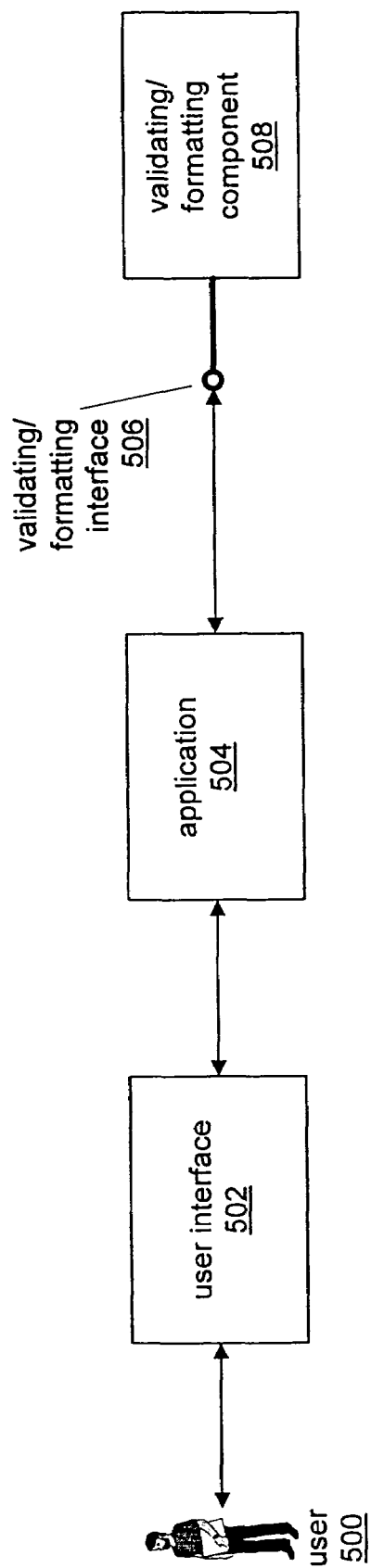
FIG. 6 illustrates one embodiment of an architecture of an application utilizing a validating/formatting component.

FIG. 6—Exemplary Application Architecture

As discussed above with reference to FIG. 4, validation/formatting components may be utilized from many types of applications. FIG. 6 illustrates one embodiment of an architecture for an application utilizing a validating/formatting component. As shown, a user 500 may interact with a user interface 502 of an application 504. The user interface may comprise text fields allowing the user to enter various types of text that fits a particular pattern or format, such as telephone numbers, social security numbers, various healthcare-related codes, etc.

The application 504 may interface with a validating/formatting component 508 via a validating/formatting interface 506. For example, the component may be a COM component, and the interface may be a COM interface, or the component may be a Java component, and the interface may be a Java interface, etc. One embodiment of a COM validating/formatting component is described above. The component 508 and the interface 506 may provide a means for the application to perform various operations related to text validation and formatting, e.g., by providing validating/formatting methods which the application may invoke whenever necessary or desired. The application may respond to the user interacting with the user interface, e.g. by intercepting various types of user interface events, such as mouse click events, control focus events, etc. For example, the application may intercept "lost focus" events for a particular text field user interface control and may invoke appropriate validating/formatting methods on the control's text in response to receiving these events. For a given application, any of various other types of events or situations may trigger the application to invoke formatting/validating methods, depending on the implementation and needs of the particular application.

It is noted that the embodiment of FIG. 6 is exemplary, and various other embodiments are possible. For example, the validating/formatting component is illustrated as a single component with a single interface. However, the validating/formatting functionality may also be implemented using multiple components and/or multiple interfaces. For example, the text validating functionality may be performed by one component, and the text formatting functionality may be performed by another component.

Also, FIG. 6 is described in terms of intercepting user events and validating/formatting user text input. The application may, of course, utilize the validating/formatting component in various other ways, however. For example, the application may use the component to format text retrieved from a database, where the text is to be displayed on the user interface. Also, the application may not necessarily have or use a user interface. For example, an application responsible for information transfer may utilize the component, e.g., to ensure that data is formatted correctly for a second application that expects data to be formatted in a particular way.

Figure 7:
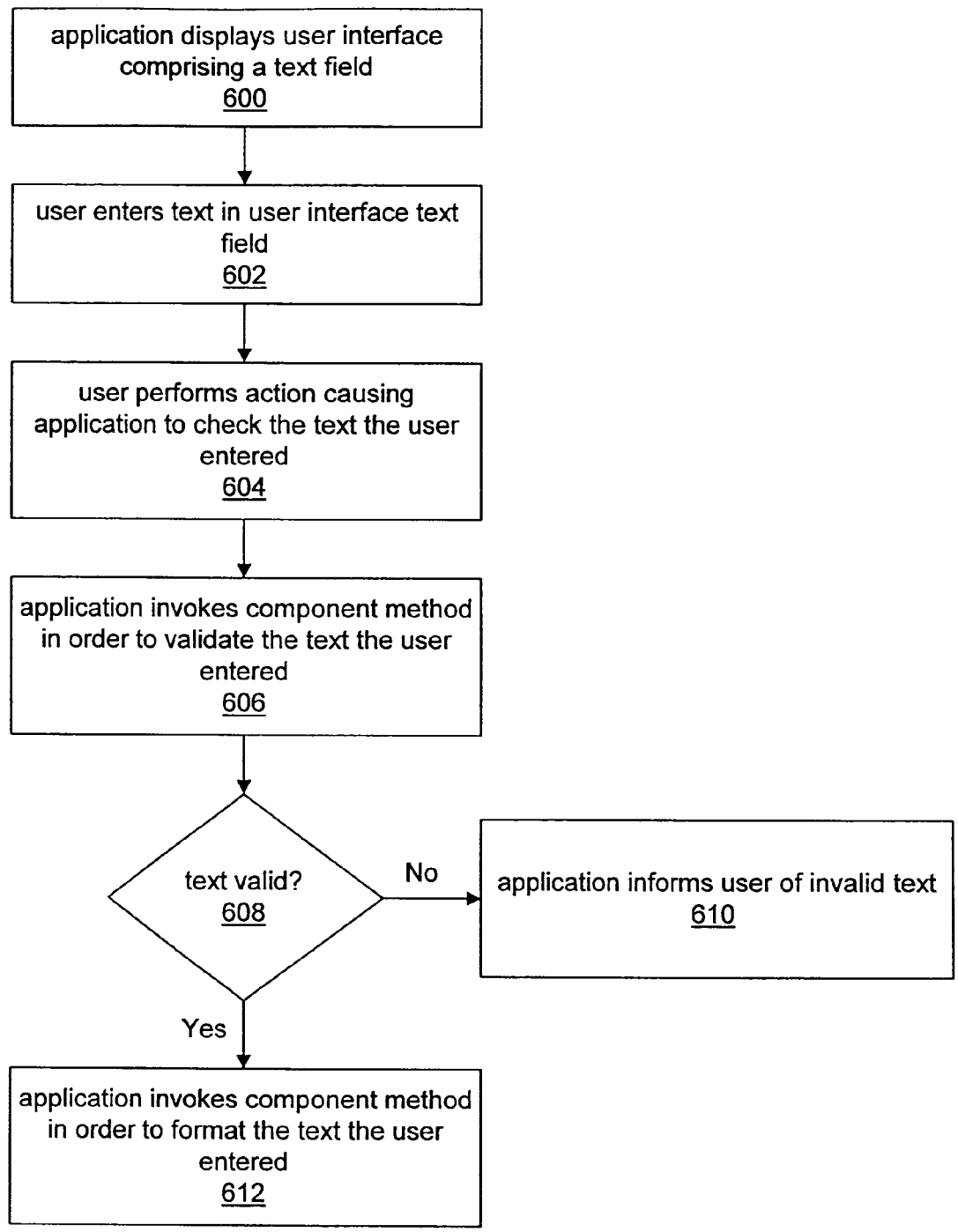
FIG. 7 is a flowchart diagram illustrating an example of an application using a validating/formatting component to validate/format user interface input text.

FIG. 7—Exemplary Use of Validating/Formatting Component for User Input

FIG. 7 is a flowchart diagram illustrating an example of an application using a validating/formatting component to validate/format user interface input text.

In step 600, an application displays a user interface comprising a text field. In one embodiment, the application may be a healthcare application, e.g., an application used by healthcare administrators to submit or process health insurance claims, and the text field may be a text field for entering healthcare-specific codes, such as Coordination of Benefits (COB) codes, Current Procedural Terminology (CPT) codes, etc.

In step 602, the user enters text in a user interface text field. The user may enter text in the text field in any way supported by the user interface, e.g., by typing or pasting the text in, etc.

In step 604, the user performs an action causing the application to check the text that the user entered in the text field. For example, as discussed above, the application may intercept user interface events, e.g. in order to check the text when the user moves away from the text field. The user may also perform various other actions causing the application to check the text, such as issuing a command to submit the data the user has entered to a database, or perform other types of transactions using the data. For example, in the case of a health insurance claims application, the user may issue a command for filing an insurance claim, and the application may, in response, check the text the user entered in the text field.

In step 606, the application may utilize a validating/formatting component in order to perform the check prompted by step 604, e.g., by obtaining an interface exposed by the component and using the interface to invoke a text validating method on the component (or an instance of the component), passing along the text to be validated. The application may perform step 606 in any way appropriate to and supported by the development environment used to construct the application and the system used to construct the component.

In step 608, the application receives the results from the validation operation performed by the validating/formatting component and uses the results to determine whether the text the user entered in the text field is valid text, e.g., by checking a procedure return value or an output parameter value.

If the application determines that the text the user entered in the text field is invalid, then in step 610 the application may inform the user of the invalid text. The application may perform step 610 in any way appropriate to the application, e.g., by displaying a dialog box, highlighting the user interface text field, displaying an error message on the user interface, generating a beep sound, etc.

If the application determines that the text the user entered in the text field is valid, then in step 612 the application may utilize the validating/formatting component in order to format the text, e.g., by invoking a component method similarly as described above for step 606. For example, the component may format the text by inserting various types of demarcating characters, such as parentheses, dashes, spaces, etc., as appropriate for a particular type of text pattern or code. Once the text is formatted appropriately, the application may redisplay the automatically formatted text, or store the formatted text in a database, or pass the formatted text to another application, etc.

As noted above, FIG. 7 is exemplary, and various steps may be added, omitted, changed, combined, etc. For example, in some cases an application may need to validate user input text, but may not need to format the text.

Figure 8:
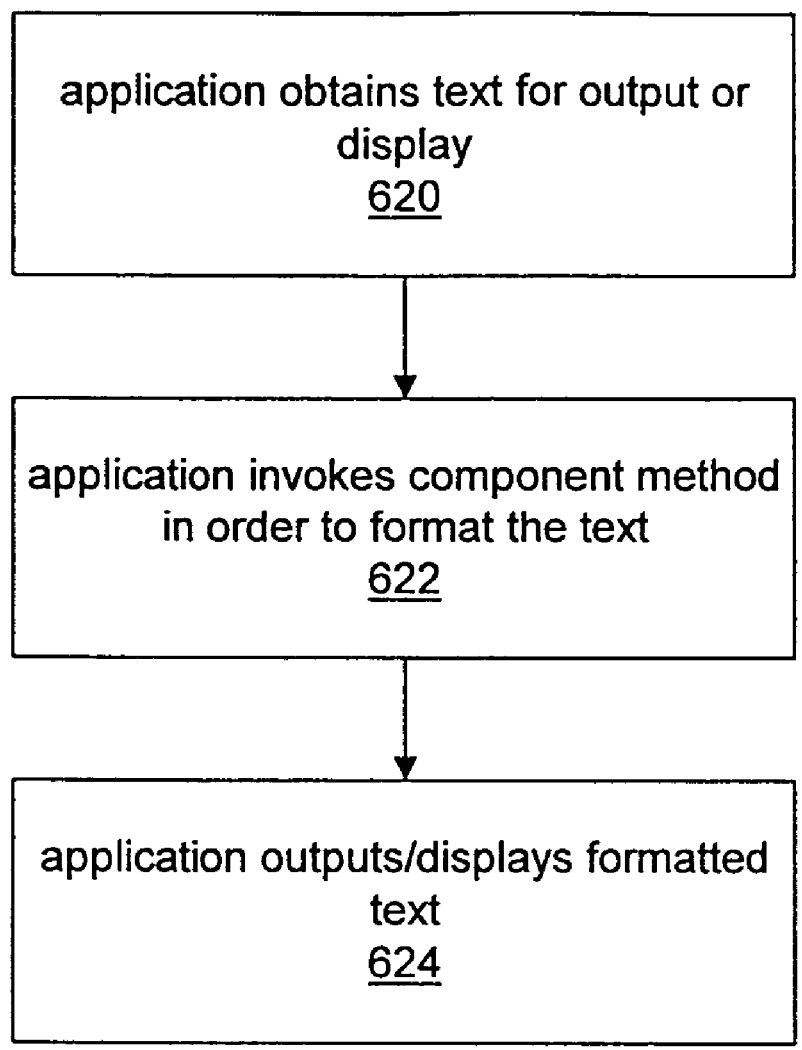
FIG. 8 is a flowchart diagram illustrating an example of an application using a validating/formatting component to validate/format output text.

FIG. 8—Exemplary Use of Validating/Formatting Component for Output Text

FIG. 8 is a flowchart diagram illustrating an example of an application using a validating/formatting component to validate/format output text.

In step 620, an application obtains text that it needs to output or display in some way. For example, the application may retrieve text from a database, such as a health insurance Coordination of Benefits (COB) code for display in the user interface of a health insurance administrative application. As another example, an application may receive text from another application, such as a COB code to be printed on a health insurance paper form.

In step 622, the application may utilize a validating/formatting component in order to format the text appropriately for output. For example, text retrieved from a database may be stored in the database in an unformatted form. The application may use the validating/formatting component to format the text with demarcation characters, similarly as described above.

In step 624, the application outputs or displays the text formatted by the validating/formatting component in step 622, e.g., by inserting the text into a user interface control, sending the formatted text to a printer, etc.

As noted above, FIG. 8 is exemplary, and various steps may be added, omitted, changed, combined, etc. For example, the application may also need to validate the text using the validating/formatting component, e.g. to verify the data integrity of information stored in a database. For example, in the case above of a COB code to be printed on a health insurance form, the COB code may be highlighted if the code is invalid.

Figure 9:
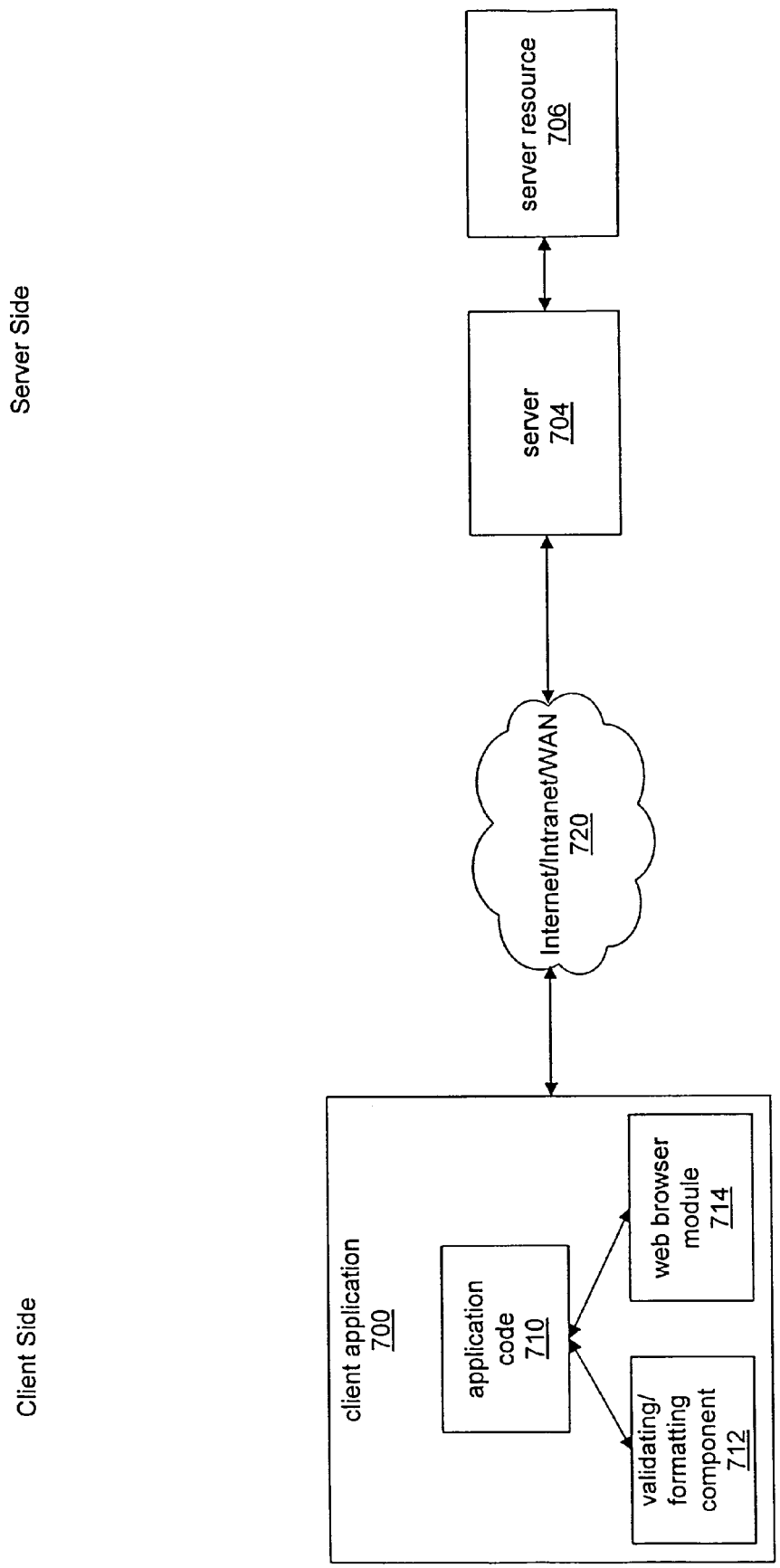
FIG. 9 illustrates one embodiment of a web application architecture for performing automatic validation/formatting as described herein.

FIG. 9—Exemplary Web Application Architecture

As noted above, applications with graphical user interfaces created from markup language files are becoming increasingly popular. One type of application that uses markup language files includes web applications utilizing HTML files comprising GUI descriptions. FIG. 9 illustrates one embodiment of a web application that utilizes validating/formatting components.

In FIG. 9, the web application is illustrated as a client/server application with a client side and a server side. Client-side application 100 may communicate with a server 104 via a network 120, such as the Internet, an Intranet, or a WAN. The client-side application 100 and the server 104 may be associated with performing various types of operations. For example, a client application may communicate with a server to perform a healthcare transaction, such as filing a health insurance claim. The server 104 typically interacts with some type of server-side resource 106 on behalf of the client application. For example, the server 104 may retrieve information from or store information to a server-side database. Depending on the application and the resource requested, the server 104 may broker client application requests to server-side application code for processing, e.g., through interfaces such as CGI, ISAPI, NSAPI, etc.

The client application 100 may run in any type of client-side environment. For example, a client application may run in a desktop computer or workstation running any of various operating systems, such as Windows, Mac OS, Unix, etc., or a client application may run in a portable computing device, such as a personal data assistant, smart cellular phone, etc. Any number of clients may communicate with the server, depending on the type of application and the resources available to the server, such as network connection speed, processing power, etc.

The client may use a network connection as a communication channel to send requests and receive responses over the network 120. Various types of network protocols, including TCP/IP-based protocols and UDP-based protocols, e.g. HTTP, HTTPS, etc., may be used to send messages across the network. As messages are sent across the network, the messages may pass through various gateways, network routers, etc. The client network connection may be a connection of any type, such as a PPP or SLIP dialup link, an Ethernet or token ring connection, an ISDN connection, a cable modem connection, any of various types of wireless connections, etc.

Client applications may access various types of resources by referencing the resources through uniform resource locators (URLs). The resources may include web pages comprising markup language code, such as HTML code or XML-derived markup language code, scripting code such as Javascript or VBScript, or other types of elements. The resources may also include any of various types of executable programs or components, such as CGI programs, Java servlets, downloadable code such as Java classes or ActiveX components, etc. The resources may also include any other type of resource addressable through a URL. Web applications are often associated with particular communication protocols, such as HTTP or SSL. However, it is noted that any communication protocol may be used to access the resources.

As shown in FIG. 9, the client-side application may comprise application code 110. The application code 110 may perform application-specific functions. For example, for a healthcare application, application code 110 may comprise application logic for health insurance claim administration, patient lookup, etc.

The client-side application may also comprise a web browser module 114. For example, Microsoft Corp. provides programming interfaces enabling applications to include various web-browsing capabilities provided by the Microsoft Internet Explorer code base. In one embodiment, the web browser module 114 may be Microsoft's Web Browser control, operating as an embedded control under control of application code 110.

As shown in FIG. 9, the application code 110 may interface with a manager component as described above, and the manager component may call various validating/formatting components, as discussed above. As discussed below, the application code may utilize the validating/formatting component to perform operations such as dynamically validating/formatting text fields as users interact with the client application user interface, dynamically formatting text retrieved from databases and displayed in HTML forms, etc.

Healthcare Applications

The problem of performing validation/formatting operations for user interface text fields is a general problem that may apply to many types of applications. In particular, text validation/formatting is a common problem encountered by developers of healthcare applications. Various types of text patterns and codes are widely used in healthcare industry information systems. For example, illnesses and diseases are often represented by a particular code, such as an International Classification of Diseases code. Other types of codes commonly used in health insurance applications and other types of healthcare applications include Coordination of Benefits (COB) codes, Current Procedural Terminology (CPT) codes, HCFA Common Procedure Coding System (HCPCS) codes, etc.

Many healthcare workers, such as health insurance claim administrators, physician office receptionists, etc., continually work with applications requiring these codes as input or displaying these codes as output. Providing automatic text formatting capabilities in these applications may enable these healthcare workers to work with healthcare codes and other types of codes without being overly concerned with pattern demarcations, etc., which may greatly enhance the user-friendliness of the applications the workers interact with and may also increase the efficiency of the workers. Providing automatic text validating capabilities for text input may greatly increase healthcare information integrity by informing application users of erroneous input at the point of error. Providing these types of formatting/validating capabilities may be particularly important for applications which are intended to be part of a healthcare information network, in which information is shared across many applications, and where applications may expect information to be encoded or demarcated in particular ways.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for automatically validating text that is input to a client computer, the method comprising:

at the client computer, processing a markup language file to receive text input, said markup language file comprising a description of a graphical user interface (GUI), the description comprising a GUI element enabled to receive the text input and an attribute specifying a type associated with the GUI element, wherein the markup language file comprises a markup language tag for instantiating a validation manager at the client computer;

in response to processing the markup language file at the client computer, instantiating the validation manager at the client computer and the validation manager instantiating a validation component corresponding to the type associated with the GUI element;

in response to processing the markup language file, displaying the GUI on a display screen at the client computer;

receiving text into the GUI element enabled to receive text;

in response to receiving text into the GUI element, sending a programmatic event to the validation manager;

in response to receiving the programmatic event at the validation manager, calling the validation component and specifying the text input to the GUI element;

the validation component determining whether the received text is valid text input for the type associated with the GUI element and returning a result value to the validation manager indicating whether the text input received by the GUI element is a valid text input; and providing an indication that the received text is invalid if the received text is determined to be invalid.

2. The method of claim 1, wherein receiving text into the GUI element comprises a user providing text input to the GUI element.

3. The method of claim 1, wherein receiving text into the GUI element comprises an application providing text into the GUI element.

4. The method of claim 1, wherein the description of the GUI comprises one or more attributes for specifying how the text input is to be validated, said first mentioned attribute being among said one or more attributes; and wherein the validation manager is operable to validate text input to the GUI element in accordance with the one or more attributes.

5. The method of claim 4, wherein each of the one or more attributes for specifying how the text input to the GUI element should be validated corresponds to at least one type of programmatic event; and wherein receiving a programmatic event comprises the validation manager ignoring the programmatic event if the programmatic event does not correspond to one of the attributes for specifying how the text input to the GUI element should be validated.

6. The method of claim 1, wherein receiving text into the GUI element comprises receiving one or more of the following actions:

changing the value of the GUI element, pressing a key, releasing a key, causing the GUI element to gain user interface focus, causing the GUI element to lose user interface focus, moving a mouse pointer over the GUI element, clicking on the GUI element, double-clicking on the GUI element;

wherein said validation manager receiving a programmatic event in response to receiving text into the GUI element comprises the validation manager receiving a programmatic event corresponding to the action performed.

7. The method of claim 1, wherein the markup language tag for instantiating the validation manager comprises one or more parameters for specifying the default behavior of when the validation manager should validate text input for GUI elements described in the markup language file.

8. The method of claim 7,
wherein the description of the GUI element enabled to receive text input comprises one or more attributes for specifying when text input to the GUI element should be validated; and
wherein the validation manager is operable to override the default behavior and validate text input to the GUI element in accordance with the one or more attributes specifying when text input received to the GUI element should be validated.

9. The method claim 1, wherein indicating that the text input received to the GUI element is invalid comprises the validation manager requesting the visual appearance of the GUI element be altered.

10. The method of claim 1, wherein indicating that the text input received to the GUI element is invalid comprises the validation manager displaying an informational user interface window.

11. The method for claim 1, wherein the validation manager is a COM object.

12. The method of claim 1, wherein the validation manager is a Java object.

13. The method of claim 1, wherein the markup language is HTML.

14. The method of claim 1, wherein the type associated with the GUI element is a type comprising one or more of: Coordination of Benefits (COB) code, Current Procedural Terminology (CPT) code, HCFA Common Procedure Coding System (HCPCS) code, International Classification of Diseases (ICD) code, U.S. Employer Information Number (EIN), U.S. Social Security Number, currency, U.S. states and territories, telephone number, zip code, date, and Boolean.

15. A method for automatically validating text that is input to a client computer, the method comprising:
at the client computer, processing a markup language file to receive text input, said markup language file comprising a description of a graphical user interface (GUI), the description comprising a GUI element enabled to receive the text input and one or more attributes for controlling text input validation for the GUI element, wherein the markup language file comprises a markup language tag for instantiating a validation manager at the client computer, said processing comprising constructing a document object representing the markup language file;
in response to processing the markup language file at the client computer, instantiating the validation manager at the client computer, wherein instantiating the validation manager comprises passing a reference to the document object to the validation manager, and wherein, in response to being instantiated by and receiving the reference to the documents object, the validation manager is operable to traverse the document object in order to discover the one or more attributes for controlling text input validation for the GUI element;
in response to processing the markup language file, displaying the GUI on a display screen at the client computer;
receiving text into the GUI element enabled to receive text;
in response to receiving text into the GUI element, sending a programmatic event to the validation manager;
in response to receiving the programmatic event at the validation manager, determining at the client computer whether the received text is valid text input; and
providing an indication that the received text is invalid if the received text is determined to be invalid.

16. The method of claim 15, wherein the one or more attributes for controlling text input validation for the GUI element include an attribute for specifying a type associated with the GUI element.

17. The method of claim 15, wherein the one or more attributes for controlling text input validation for the GUI element include one or more an attributes for specifying when text input to the GUI element should be validated.

18. The method of claim 15, wherein the one or more attributes for controlling text input validation for the GUI element include one or more attributes for specifying how invalid text input for the GUI element should be indicated.

* * * * *